United States Patent [19]

Labana et al.

[11] 4,085,260
[45] Apr. 18, 1978

[54] POWDER COATING COMPOSITIONS WITH HYDROXY CONTAINING ACRYLIC COPOLYMERS-I AND CARBOXYLIC ACID OR ANHYDRIDE CROSSLINKING AGENT

[75] Inventors: Santokh S. Labana, Dearborn Heights; Yun Feng Chang, Plymouth, both of Mich.

[73] Assignee: Ford Motor Company, Dearborn, Mich.

[21] Appl. No.: 795,587

[22] Filed: May 10, 1977

Related U.S. Application Data

[63] Continuation of Ser. No. 526,547, Nov. 25, 1974, abandoned, which is a continuation-in-part of Ser. No. 407,128, Oct. 17, 1973, abandoned, which is a continuation of Ser. No. 172,223, Aug. 16, 1971, abandoned.

[51] Int. Cl.$^2$ ............... C08F 265/04; C08G 63/12
[52] U.S. Cl. ............... 526/16; 260/875; 260/885; 260/901; 526/56; 526/320
[58] Field of Search ............... 526/16, 56, 320; 260/875, 885, 901

[56] References Cited

U.S. PATENT DOCUMENTS

| | | | |
|---|---|---|---|
| 3,741,272 | 6/1973 | Ullrich et al. | 159/2 E |
| 3,787,521 | 1/1974 | Labana et al. | 260/836 |
| 3,876,587 | 4/1975 | Matsui et al. | 260/78.4 D |

*Primary Examiner*—John Kight, III
*Attorney, Agent, or Firm*—Roger L. May; Keith L. Zerschling

[57] ABSTRACT

Powder coating compositions are disclosed which, exclusive of pigments and other nonreactant components comprise a coreactive mixture of: (A) a copolymer of between about 5 and about 20 weight percent of a hydroxy bearing monomer and between about 95 and about 80 weight percent of other monoethylenically unsaturated monomers, said copolymer having a glass transition temperature in the range of about 40° C to about 90° C and a number average molecular weight ($\overline{M}_n$) of between about 2000 and about 10,000; and an organic di- or poly-carboxylic acid or di- or poly-carboxylic acid anhydride crosslinking agent, said crosslinking agent being present in an amount of from about 0.8 to about 1.1 crosslinkable functional groups for each hydroxy group in the copolymer.

10 Claims, No Drawings

POWDER COATING COMPOSITIONS WITH HYDROXY CONTAINING ACRYLIC COPOLYMERS-I AND CARBOXYLIC ACID OR ANHYDRIDE CROSSLINKING AGENT

This is a continuation of application Ser. No. 526,457, filed Nov. 25, 1974, and now abandoned which is a continuation-in-part of application Ser. No. 407,128 filed Oct. 17, 1973, and now abandoned which, in turn, is a continuation of application Ser. No. 172,223, filed Aug. 16, 1971 and now abandoned and relates to thermosetting powder paint compositions which are useful for providing protective and decorative surface coatings on a variety of substrates including glass, metal and other substrates which can withstand the curing temperature of the powder.

Powder coating compositions have become increasingly desirable in recent years for various reasons including those relating to ecology, health and safety. In particular, powder coating compositions are preferable to liquid paints. Such paints, as exemplified by the paint system shown in U.S. Pat. No. 2,857,354, issued Oct. 21, 1958, contain large amounts of solvents which must be volatilized after application during drying, thus resulting in solvents escaping into the atmosphere and creating health and safety hazards as well as undesirable pollution problems. The powder coating compositions of this invention, on the other hand, release little, if any, volatile materials when cured. In addition, the powders have good stability at room temperature, have fast cure times at elevated temperatures, form hard coatings exhibiting excellent solvent resistance, are non-yellowing on over-bake and are usable with metallic pigments. The cured coatings from preferred compositions of this invention have a high gloss and smooth finish with a low amount of craters therein.

SUMMARY OF THE INVENTION

The powder coating compositions of this invention, exclusive of pigments and other nonreactive components, comprise a coractable mixture of: (A) a copolymer of between about 5 and about 20 weight percent of a hydroxy bearing monomer and between about 95 and about 80 weight percent of other monoethylenically unsaturated monomers, said copolymer having a glass transition temperature in the range of about 40° C to about 90° C and a number average molecular weight ($\overline{M}_n$) of between about 2,000 and about 10,000; and (B) a crosslinking agent for the hydroxy bearing copolymers in an amount of from about 0.8 to about 1.1 crosslinkable groups for each hydroxy group in the copolymer. In addition, the powder coating compositions may include additives such as catalysts, flow control agents, anti-static agents, pigments, plasticizers, etc.

DETAILED DESCRIPTION OF INVENTION

Hydroxy Functional Copolymer

The principal material in the powder coating compositions of this invention is a hydroxy functional copolymer which may be formed by conventional free radical induced polymerization of suitable unsaturated monomers. The term "copolymer" as used herein means a polymer of two or more different monomers.

The copolymers used to prepare the copolymers of the powder coating compositions of the invention contain between about 5 and about 20 weight percent, preferably between about 8 and about 15 weight percent, and still more preferably about 12 weight percent, of a hydroxy bearing monomer. These monomers provide the copolymer with its pendant hydroxy functionality. The long list of hydroxy functional monomers which may be employed in the copolymers of the invention includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptgyl acrylate; 2-hydroxymethyl methacrylate; 3-chloro-2 hydroxypropyl methacrylate; 2-hydroxy-1-methylethyl methacrylate; 2-hydroxypropyl methacrylate; 3-hydroxypropyl methacrylate; 2,3 dihydroxypropyl methacrylate; 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7 hydroxyheptyl methacrylate. Although one of ordinary skill in the art will recognize that many different hydroxy bearing monomers including those listed above may be employed, the preferred hydroxy functional monomers for use in the copolymer of this invention are: 2-hydroxyethyl acrylate; 2-hydroxyethyl methacrylate, hydroxypropyl acrylate and hydroxypropyl methacrylate.

The remainder of the monomers forming the hydroxy-functional copolymer, i.e., between about 95 and about 80 weight percent, preferably between about 92 and about 85 weight percent, and most preferably 88 weight percent, are other monoethylenically unsaturated monomers. The monoethylenically unsaturated monomers are preferably monofunctional alpha-beta olefinically unsaturated monomers, i.e., monomers bearing olefinic unsaturation between the two carbon atoms in the alpha and beta positions with respect to the terminus of an aliphatic carbon-to-carbon chain.

Among the monofunctional alpha-beta olefinically unsaturated monomers which may be employed are acrylates (meaning esters of both acrylic and methacrylic acids) as well as mixtures of acrylates and vinyl hydrocarbons. Preferably, in excess of 50 weight percent of the total copolymer monomers are esters of a $C_1$-$C_{12}$ monohydric alcohol and acrylic or methacrylic acid, e.g., methyl methacrylate, ethyl acrylate, butyl acrylate, butyl methacrylate, hexyl acrylate, 2-ethylhexyl acrylate, lauryl methacrylate, etc. Among the monovinyl hydrocarbons suitable for use in forming the copolymer are those containing 8 to 12 carbon atoms and including styrene, alpha methyl styrene, vinyl toluene, t-butyl styrene and chlorostyrene. When such monovinyl hydrocarbons are employed, they should constitute less than 50 weight percent of the copolymer. Other vinyl monomers such as vinyl chloride, acrylonitrile, methacrylonitrile, and vinyl acetate may be included in the copolymer as modifying monomers. However, when employed these modifying monomers should constitute only between about 0 and about 35 weight percent of the monomers in the copolymer.

The hydroxy functional copolymers used in the coating composition of the invention have a glass transition temperature between about 40° and about 90° C, preferably between about 50° and about 80° C, and most preferably between about 50° and about 70° C. The molecular weight ($\overline{M}_n$) range for the copolymer may be between about 2,000 and about 10,000 preferably between about 3,000 and about 6,500, and more preferably between about 3,000 and about 4,000. A preferred copolymer for use in the coating compositions of this invention has a glass transition temperature between about 50° and about 80° C and a molecular weight of between about 3,000 and about 6,500. A still more preferred copolymer has a glass transition temperature between 50° and about 70° C and a molecular weight between about 3,000 and about 4,000.

In preparing the copolymer, the hydroxy functional monomer and the remaining monoethylenically unsaturated monomers may be mixed and reacted by conventional free radical initiated polymerization in such proportions as to obtain the copolymers desired. A large number of free radical initiators are known to the art and are suitable for this purpose. These include: benzoyl peroxide; lauryl peroxide; t-butylhydroxy peroxide; acetylcyclohexane sulfonyl peroxide; diisobutyryl peroxide; di-(2-ethylhexyl) peroxydicarbonate; diisopropyl peroxydicarbonate; t-butylproxypivalate; decanoyl peroxide; azobis (2-methylpropionitrile); etc. Polymerization is preferably carried out in solution using a solvent in which the hydroxy functional copolymer is soluble. Included among these solvents are toluene, xylene, dioxane, butanone, etc. If the hydroxy functional copolymer is prepared in solution, the solid copolymer can be precipitated by pouring the solution at a slow rate into a non-solvent for the copolymers such as nexane, octane, or water under suitable agitation conditions. The copolymer thus obtained is then further dried so that it contain less than 3% of the materials are volatilize at temperatures used for baking the coating. Alternatively, the copolymer can be obtained by evaporating the solvents under vacuum or by employing spray drying techniques.

These copolymers can also be prepared by emulsion polymerization, suspension polymerization, bulk polymerication or other suitable methods. In these methods of preparing the copolymers, chain transfer agents may be required to control the molecular weight of the copolymer of a desired range. However, when chain transfer agents are used care must be taken so that they do not decrease the shelf stability of the powder by causing premature chemical reaction. The solid copolymers obtained by these methods must also be dried to contain less than 3% of the materials that volatilize at the temperatures used for baking the coating.

The molecular weight and molecular weight distribution of the hydroxy functional copolymer is important in obtaining outstanding powder coating compositions. While the molecular weight ($M_n$) may range from about 2,000 to about 10,000, the copolymer component must not contain significant amounts of higher molecular weight fractions. Thus, no more than 2% of the copolymer should be of molecular weight greater than 20,000 and the molecular weight distribution as measured by the ratio of weight average molecular weight to number average molecular weight ($M_w/M_n$) should be in the range of 1.6 to 2.1, with the preferred range of molecular weight distribution being in the range of 1.7 to 1.8.

Crosslinking Agent

The crosslinking agent component of the powder coating composition of the invention is either an organic di- or poly-carboxylic acid or an organic di- or poly-carboxylic acid anhydride. This component, which is present in the composition in an amount ranging from about 0.8 to about 1.1 crosslinkable functional groups for each hydroxy group in the copolymer, reacts with the hydroxy functionality of the copolymer during baking or curing to form a tough, resistent coating. The organic crosslinking agent may be selected from the following types of organic di- or poly-carboxylic acids and anhydrides thereof: saturated and unsaturated aliphatic di- or poly-carboxylic acids containing between about 4 and about 20 carbon atoms; cyclic di- or poly-carboxylic acids including aromatic carboxylic acids as well as saturated and unsaturated alicyclic carboxylic acids; heterocyclic di- or poly-carboxylic acids; polymers of saturated and unsaturated aliphatic carboxylic acids; and mixtures thereof.

Among the many saturated aliphatic carboxylic acids which may be employed, or the anhydrides of which may be employed, are: adipic acid, pimelic acid, azelaic acid; succinic acid; dodecylsuccinic acid; methylsuccinic acid; cumylsuccinic acid; 2,3 dimethylsuccinic acid; 2,2 dimethylsuccinic acid; glutaric acid; 2,2 dimethylglutaric acid; 2,3 dimethylgutaric and tricarballylic acid. Among the suitable unsaturated aliphatic carboxylic acids which may be employed, or the anhydrides of which may be employed, are: maleic acid, citraconic acid; itaconic acid; 2,3 dimethylmaleic acid; dichloromaleic acid; chlorendic acid; and bromolaleic acid.

As noted above, cyclic carboxylic acids and anhydrides thereof, including aromatic carboxylic acids and their anhydrides as well as saturated and unsaturated alicyclic carboxylic acids and their anhydrides, may be employed. Suitable aromatic carboxylic acids which may be employed, and the anhydrides of which may be employed, include; phthalic acid isophthalic acid; terephthalic acid; 3-methylphthalic acid; 4-, methylphthalic acid; trimellitic acid; 1,8 naphthalic acid; 3-nitrophthalic acid; 3-nitro-1,8-naphthalic acid; p-chlorophthalic acid; tetrabromophthalic acid; tetrachlorophthalic acid; naphthalene tetracarboxylic acid; 1, 2, 4, 5 benzenetetracarboxylic acid; 3, 3', 4, 4'-benzophenone tetracarboxylic; and 3, 4, 9, 10-perylenetetracarboxylic acid. Among the suitable saturated alicyclic carboxylic acids which may be employed, and the anhydrides of which may be employed, are: hexahydrophthalic acid, cis 1, 2 cyclohexanedicarboxylic acid; trans 1, 2 cyclohexanedicarboxylic acid; cyclooctane-1, 2- dicarboxylic acid; cis 1. 2-cyclobutanedicarboxylic acid; 1, 2, 3, 4-cyclobutanetetracarboxylic acid; 1, 2, 3, 4-cyclopentanetetracarboxylic acid; cyclohexane-1,2-dicarboxylic acid; 4-methylhexane-1,2-dicarboxylic acid; and cyclopentane-1,2-dicarboxylic acid. Among the unsaturated alicyclic carboxylic acids which may be employed, and the anhydrides of which may be employed, are: the maleic acid adduct of methyl cyclopentadiene; dimethyl substituted butenyltetrahydrophthalic acid; tetrahydrophthalic acid; and methyltetrahydrophthalic acid.

Representative of the heterocyclic carboxylic acids which may be employed, and the anhydrides of which may be employed, are: tetrahydrofuran 2,3,4,5-tetracarboxylic acid; 7 oxabicyclo [2.2.1] hept-5-ene-2,3-dicarboxylic acid; 7-heltane-2,3-dicarboxylic acid; 5-chloroisatoix acid; diglycolic acid; and 2,3 pyridinedicarboxylic acid.

Included among the many polymeric carboxylic acids which may be employed, and the anhydrides of which may be employed, are: poly(azelaic acid); poly(- sebasic acid); poly(adipic acid); poly(pimelic acid); and poly(suberic acid).

Although one skilled in the art will recognize that any one of a vast number of carboxylic acids or anhydrides thereof, including those mentioned above, may be employed as crosslinking agents in the powder coating compositions of this invention, certain carboxylic acids and carboxylic acid anhydrides are preferred. The preferred carboxylic acids are dicarboxylic acids such as succinic acid, glutaric acid, adipic acid, pimelic acid, azelaic acid, phthalic acid, isophthalic acid and terephthalic acid. Preferred carboxylic acid anhydride crosslinking agent include phthalic anhydride, p-chlorophthalic anhydride, tetrabromophthalic anhydride, cyclohexane-1, 2 dicarboxylic anhydride, 4-methylhexane-1, 2 dicarboxylic anhydride, cyclopentane-1, 2 dicarboxylic anhydride, succinic anhydride, dodecyl succinic anhydride; maleic anhydride, polyazelaic anhydride and methylsuccinic anhydride.

Additional Additives

The coating compositions formed in accordance with the teachings of this invention may and preferably do include a small amount, generally from about 0.05% weight to about 1.0% by weight of the total weight of the powder composition, of a catalyst in order to increase the crosslinking rate of the powder coating during baking. Baking temperatures ordinarily are in the range of about 130° to about 200° C, preferably about 140° to about 170° C, and the catalyst should produce a gel time at the baking temperature of between about 1 minute and about 40 minutes. Preferably, however, the gel time is in the range of about 1 to about 10 minutes and most preferably is in the range of about 2 to about 8 minutes. Among the many suitable catalysts, which are preferably solid at room temperature and have a melting point from 50° to 200° C are organic acids and compounds that generate acids on heating above 100° C. Included among these are, for example, zinc chloride, stannic chloride, stannous octoate, stannous oxide, tetraalkyltitanates such as tetrabutyl titanates and titanium complexes such as titanium acetylacetonate. Other catalysts include: methyl-p-toluene sulfonate, monobutyl acid phosphate, p-toluene sulfonic acid, hydroquinone, taneric acid, pyrogallol, sodium hydrogen sulfate and aromatic amines such as aniline and phenylenediamine.

The powder paint composition also may advantageously include a flow control agent in an amount ranging from about 0.05 weight percent to about 4.0 weight percent of the total powder composition. In general, the flow control agent should be a polymer having a number average molecular weight of at least 1,000, have a surface tension which is lower than the surface tension of the copolymer employed in the coating composition at the baking temperature of the powder coating composition, and have a glass transition temperature which is at least 50° C below the glass transition temperature of the hydroxy containing copolymer. The polymeric flow control agent must be such that it will not affect the viscosity of the powder to a significant degree, but aid in closing pores and voids during film formation. In order for pore closure to take place, the spreading of the molten copolymer must be retarded and this can usually be accomplished by addition of a small amount of such a polymer flow control agent which has a lower surface tension than the surface tension of the copolymer used in the composition. However, the minimum molecular weight of the flow control agent is important since too low a molecular weight, therefore too low a viscosity, will result in the flow control agent diffusing out from the molten copolymer and filling the voids and pores itself, thus producing a film with nonhomogenous composition which has neither good appearance nor good weather in properties. Also, polymeric flow control agents of too low a molecular weight tend to diffuse to the surface of the powder particles during storage and usually cause caking. Among the many polymeric flow control agents which may be employed acrylic polymers, which may be prepared by polymerization of acrylate and methacrylate monomers in bulk or in suitable solvents using well know free radical initiators, are preferred. These preferred acrylic polymers are prepared using an initiator and polymerization conditions which will result in a polymer having a molecular weight ($\overline{M}_n$) above 1,000, preferably above 3,000 and most preferably between about 5,000 and about 20,000. Among the preferred acrylic polymers useful as flow control agents are polylauryl acrylate, polybutyl acrylate, poly (2-ethylhexyl acrylate), polyvinyl methacrylate and polyisodecyl methacrylate.

Although acrylate flow control agents are preferred, fluorinated polymers having a surface tension, at the baking temperatures of the powder, lower than that of the copolymer used in the mixture may be employed. Preferred flow control agents, if the agent is a fluorinated polymer are esters of polyethyleneglycol or polypropyleneglycol and fluorinated fatty acids. For example, an ester of polyethyleneglycol of molecular weight of over 2,500 and perfluoroctanoic acid is a useful flow control agent. Polymeric siloxanes of molecular weight ($\overline{M}_n$) over 1,000, advantageously 1,000 to 20,000, may also be useful as flow control agents, e.g., alkyl substituted siloxanes such as polydimethyl siloxane, polymethylphenyl siloxane, polydiphenyl siloxane, etc. and halogenated siloxanes such as poly (3,3,3-trifluoropropylmethyl siloxane), poly (perfluordimethyl siloxane), poly (pentafluorophenylmethyl siloxane), etc. It will be appreciated by one skilled in the art that while the specific flow control agents enumerated above are preferred, many other flow control agents meeting the above-defined requirements for this component may be employed.

Since the powder coating compositions of the invention may be applied to articles by electrostatic spray techniques, the composition may also include a small weight percent of an antistatic agent. In particular, the antistatic agent is included in a range from about 0.05 weight percent to about 1.0 weight percent of the total powder composition. Suitable antistatic agents include, but are not limited to tetraalkylammonium salts, alkylpoly(ethyleneoxy) phosphates as, for example, dibutylpoly(ethyleneoxy) phosphate; alkylaryl poly(ethyleneoxy) phosphate, as for example, ethylbenzylpoly (ethyleneoxy) phosphate; polyethyleneimine, poly (2-vinylpyrollidone), phridinium chloride, poly (vinylpyridium chloride), polyvinyl alcohol or inorganic salts.

In order to give individual powder coating compositions a suitable color, a pigment may be included. In general, the pigments forms from about 6 to about 35 weight percent of the total powder coating composition. Pigments which are suitable for powder coating compositions include, but are not limited to, the following: basic lead silica chromate, 30 percent by weight (orange); titanium dioxide, 30 percent by weight (white); titanium dioxide, 15 weight percent plus ultramarine blue, 10 weight percent (blue); phthalocyanine blue, 7 weight percent, plus titanium dioxide, 10 weight percent (blue); phthalocyanine green, 7 weight percent, plus titanium dioxide, 10 weight percent (green); ferrite yellow, 7 weight percent, plus titanium dioxide, 10 weight percent (yellow); carbon black, 6 weight percent (black); black iron oxide, 10 weight percent (black); chromium green oxide, 8 weight percent, plus titanium dioxide, 10 weight percent (green); Quindo red, 5 weight percent plus titanium dioxide, 16 weight percent (red); and iron oxide transparent orange pigment, 10 weight percent (orange). Metallic pigments such as aluminum may also be included up to 10 weight percent to give the baked coating a metallic appearance.

Having described the various materials which are employed in formulating the powder coating compositions of this invention, a plurality of examples are hereinafter set forth to illustrate the same. It should be understood that the specific examples are presented by way of illustration and not by way of limitation.

EXAMPLE 1

The monomers, 2-hydroxyethyl methacrylate 15 parts, ethyl acrylate 25 parts, methyl methacrylate 60 parts and the initiator 2,2'-azobis-(2-methylpropronitrile) (AIBN) 4 parts are mixed together. A one liter, four-necked flask is provided which contains 150 ml of toluene and 150 ml of methyl ethyl ketone. The contents of the flask is heated to a refluxing temperature of 85° C. The monomer mixture (208 grams) is added in a dropwise fashion over a period of one and a half hours to the reaction mixture which is maintained at 85° C. After the monomer addition is complete, 0.5 grams of AIBN (dissolved in 20 grams of toluene) is added dropwise. The refluxing is continued for an additional one half hour to complete the polymerization.

The solution is poured into shallow stainless steel trays. These trays are placed in a vacuum oven and the solvent evaporated therefrom. As the solvent is removed, the copolymer becomes more concentrated. The temperature of the vacuum oven is raised to 110° C. Drying is continued until the solvent content of the copolymer is below 3 percent. The trays are cooled and the copolymer collected and ground to pass through 20 mesh screen.

One hundred parts by weight of the ground copolymer are mixed with the following materials:

| | |
|---|---|
| Adipic acid | 8.0 parts |
| Zinc Chloride | 0.8 parts |
| Polylauryl acrylate ($\overline{M}_n$=5,000) | 0.7 parts |
| Titanium dioxide | 30 parts |

The materials are mixed together in a ball mill for 2 hours. The mixture is mill rolled at 85° to 90° C for 5 minutes. The solid obtained is ground in a ball mill to pass through a 140 mesh screen.

The resulting powder thus obtained is a powder coating of this invention. The powder is sprayed on an electrically grounded, steel panel by using an electrostatic powder spray gun operating at 50 KV charging voltage. After spraying, the panel is heated to a temperature of 175° C for 20 minutes.

The coating obtained on the panel has good adhesion to the steel panel. The coating also is applied to and has good adhesion on panels of glass, brass, zinc, aluminum, copper and bronze. The coating is not soluble in toluene, gasoline, tutanone or methanol.

EXAMPLE 2

The procedure of Example 1 is repeated. The formation of the copolymer, however, begins with a monomer mixture having 2-hydroxyethyl methacrylate 20 parts, butyl methacrylate 40 parts, methyl methacrylate 40 parts, and the initiator AIBN 4 parts. The resulting copolymer has a molecular weight ($\overline{M}_n$) of 3,500.

One hundred parts by weight of the ground copolymer is mixed with the following materials:

| | |
|---|---|
| Terephthalic acid | 12 parts |
| Stannic chloride | 0.8 parts |
| Poly(2-ethylhexyl acrylate) ($\overline{M}_n$=9,000) | 0.5 parts |
| Quindo red | 4 parts |
| Metallic aluminum flakes | 4 parts |

A powder coating composition obtained from the mixture by following the steps of Example 1 is applied to test panels as described in Example 1. The panels are baked at 180° C for 25 minutes. The panels produced have good solvent resistance and a metallic appearance.

EXAMPLE 3

The procedure of Example 1 is repeated. The formation of the copolymer, however, begins with a monomer mixture having 2-hydroxyethyl acrylate 15 parts, butyl methacrylate 43 parts, methyl methacrylate 42 parts and the initiator AIBN 1 part. The resulting copolymer has a molecular weight ($\overline{M}_n$) of 10,000.

One hundred parts by weight of the ground copolymer is mixed with the following materials:

| | |
|---|---|
| Pimelic acid | 8 parts |
| Tetrabutyl titanate | 0.5 parts |
| Polybutylacrylate($\overline{M}_n$=15,000) | 0.3 parts |
| Titanium dioxide | 10 parts |
| Phthalocyanine blue | 7 parts |

A powder coating composition is obtained from the mixture by following the process steps set forth in Example 1. The coating composition is applied to a series of test panels and baked at 170° C for 30 minutes. The cotaings obtained on the various panels are of good appearance and are resistant to the solvents mentioned in Example 1.

EXAMPLE 4

The procedure of Example 1 is repeated. The formation of the copolymer, however, begins with a monomer mixture having 2-hydroxypropyl acrylate 20 parts, styrene 70 parts, butyl acrylate 10 parts and the initiator AIBN 2 parts. The resulting copolymer has a molecular weight ($\overline{M}_n$) of 6,500.

One hundred parts by weight of the ground copolymer is mixed with the following materials:

| | |
|---|---|
| Phthalic anhydride | 11.5 parts |
| Stannic chloride | 1.0 parts |
| Polybutyl acrylate($\overline{M}_n$=5,000) | 0.4 parts |
| Phthaloycanine green | 7 parts |
| Titanium dioxide | 10 parts |

A powder coating composition is obtained from the mixture by following the process steps set forth in Example 1. The coating composition is applied to a series of test panels and baked at 180° C for 30 minutes. The coatings obtained on the various panels are of good appearance and are resistant to the solvents set forth in Example 1.

EXAMPLE 5

The procedure of Example 1 is repeated. The formation of the copolymer, however, begins with a monomer mixture having 2-hydroxypropyl methacrylate 20 parts, 2 ethylhexyl acrylate 10 parts, methyl methacrylate 70 parts and the initiator AIBN 3 parts. The resulting copolymer has a molecular weight ($\overline{M}_n$) of 4,500.

One hundred parts by weight of the ground copolymer is mixed with the following materials:

| | |
|---|---|
| Tetrahydrophthalic anhydride | 10.5 parts |
| p-Toluene sulfonic acid | 1.0 parts |
| Poly(2-ethylhexyl acrylate)($\overline{M}_n$=20,000) | .5 parts |
| Ferrite yellow | 7 parts |
| Titanium dioxide | 10 parts |

A powder coating composition is obtained from the mixture by following the process steps set forth in Example 1. The coating composition is applied to a series of test panels and baked at 160° C for 30 minutes. The coatings obtained on the various panels are of good appearance quality and are resistant to the solvents set forth in Example 1.

EXAMPLE 6

The procedure of Example 1 is repeated. The formation of the copolymer, however, begins with a monomer mixture having 2-hydroxypropyl acrylate 10 parts, ethyl methacrylate 90 parts and the initiator AIBN 1.5 parts. The resulting copolymer has a molecular weight ($\overline{M}_n$) of 8,500.

One hundred parts by weight of the ground copolymer is mixed with the following materials:

| | |
|---|---|
| 1,1 cyclopentanediacetic anhydride | 8 parts |
| Tetraisopropyl titanate | 0.7 parts |
| Poly (isodecyl Methacrylate) ($\overline{M}_n$ = 9,000) | 0.5 parts |
| Transparent blue | 4 parts |
| Metallic aluminum flakes | 4 parts |

A powder coating composition is obtained from the mixture by following the process steps set forth in Example 1. The coating composition is applied to a series of test panels as described in Example 1 and baked at a temperature of 180° C for 20 minutes. The coatings obtained on the various panels have a metallic appearance and are resistant to the solvents mentioned in Example 1.

EXAMPLE 7

The procedure of Example 1 is repeated. The formation of the copolymer, however, begins with a monomer mixture having 2-hydroxyethyl methacrylate 15 parts, ethyl acrylate 10 parts, methyl methacrylate 75 parts and the initiator AIBN 3 parts. The resulting copolymer has a glass transition temperature of 75° C One hundred parts by weight of the ground copolymer is mixed with the following materials:

| | |
|---|---|
| Hexadrophthalic anhydride | 9 parts |
| Acetylacetonate titanium | 2 parts |
| Polyethyl acrylate ($\overline{M}_n$ = 7,500) | 0.4 parts |
| Chronmium green oxide | 8 parts |
| Titanium dioxide | 10 parts |

A powder coating composition is obtained from the mixture by following the process steps of Example 1. The coating composition is applied to a series of test panels as described in Example 1 and baked at 180° C for 30 minutes. The coatings obtained on the various panels are of good appearance quality and are resistant to the solvents mentioned in Example 1.

EXAMPLE 8

The procedure of Example 1 is repeated. The formation of the copolymer, however, begins with a monomer mixture having 2-hydroxyethyl methacrylate 15 parts, ethyl acrylate 5 parts, methyl methacrylate 80 parts and the initiator AIBN 3 parts. The resulting copolymer has a glass transition temperature of 85° C.

One hundred parts by weight of the ground copolymer is mixed with the following materials:

| | |
|---|---|
| Octric anhydride (α-2-carboxyethyl glutaric anhydride) | 7 parts |
| Zinc chloride | 0.7 parts |
| Polyisodecyl methacrylate ($\overline{M}_n$ = 12,000) | 0.7 parts |
| Quindo red | 4 parts |
| Titanium dioxide | 4 parts |

A powder coating composition is obtained from the mixture by following the process steps of Example 1. The coating composition is applied to a series of test panels as described in Example 1 and baked at a temperature of 190° C for 25 minutes. The coating obtained on the various panels are of good appearance quality and are resistant to the solvents mentioned in Example 1.

EXAMPLE 9

The procedure of Example 1 is repeated. The formation of the copolymer, however, begins with a monomer mixture having 2-hydroxyethyl methacrylate 15 parts, ethyl acrylate 15 parts, methyl methacrylate 70 parts and the initiator AIBN 3 parts. The resulting copolymer has a glass transition temperature of 68° C.

One hundred parts by weight of the ground copolymer is mixed with the following materials:

| | |
|---|---|
| Cyclohexane-1,2 dicarboxylic anhydride | 12 parts |
| Tetrabutyl titanate | 0.8 parts |
| Poly (2-ethylhexyl acrylate) ($\overline{M}_n$ = 8,500) | .5 parts |
| Titanium dioxide | 30 parts |

A powder coating composition is obtained from the mixture by following the process steps of Example 1. The coating composition is applied to a series of test panels as described in Example 1 and baked at a temperature of 170° C for a period of 30 minutes. The coatings obtained on the various panels are of good appearance quality and are resistant to the solvents mentioned in Example 1.

EXAMPLE 10

The procedure of Example 1 is repeated. The formation of the copolymer, however, begins with a monomer mixture having 2-hydroxyethyl methacrylate 15 parts, ethyl acrylate 20 parts, methyl methacrylate 60 parts and the initiator AIBN 3 parts. The resulting copolymer has a glass transition temperature of 60° C.

One hundred parts by weight of the ground copolymer is mixed with the following materials:

| | | |
|---|---|---|
| 4-Methylhexane-1,2 dicarboxylic anhydride | 11 | parts |
| Zinc chloride | 1 | part |
| Polyethyleneblycol perfluoro octoate | 2 | parts |
| Carbon black | 6 | parts |

A powder coating composition is obtained from the mixture by following the process steps of Example 1. The coating composition is applied to a series of test panels as described in Example 1 and baked at a temperature of 185° C for a period of 20 minutes. The coatings obtained on the various panels are of good appearance quality and are resistant to the solvents mentioned in Example 1.

EXAMPLE 11

The procedure of Example 1 is repeated. The formation of the copolymer, however, begins with a monomer mixture having 2-hydroxyethyl methacrylate 15 parts, ethyl acrylate 30 parts, methyl methacrylate 55 parts and the initiator AIBN 3 parts. The resulting copolymer has a glass transition temperature of 47° C.

One hundred parts by weight of the ground copolymer is mixed with the following materials:

| | | |
|---|---|---|
| Azelaic acid | 11 | parts |
| Zinc chloride | 0.7 | parts |
| Polybutyl acrylate ($\overline{M}_n=2,500$) | 0.3 | parts |
| Phthaloycyanine green | 7 | parts |
| Titanium dioxide | 10 | parts |

A powder coating composition is obtained from the mixture by following the process steps of Example 1. The coating composition is applied to a series of test panels and baked at a temperature of 180° C for 30 minutes. The coatings obtained on the various panels are of good appearance guality and are resistant to the solvents mentioned in Example 1.

EXAMPLE 12

The procedure of Example 1 is repeated. The formation of the copolymer, however, begins with a monomer mixture having 2-hydroxyethyl methacrylate 15 parts, methyl methacrylate 85 parts and the initiator AIBN 3 parts. The resulting copolymer has a glass transition temperature of 95° C.

One hundred parts by weight of the ground copolymer is mixed with the following materials:

| | | |
|---|---|---|
| Adipic acid | 8.4 | parts |
| Zinc chloride | 0.8 | parts |
| Polylauryl methacrylate | 0.8 | parts |
| Carbon black | 6 | parts |

A powder coating composition is obtained from the mixture by following the process steps of Example 1. The coating composition is applied to a series of test panels and baked at a temperature of 170° C for 20 minutes. The coating obtained on the various panels shows poor flow characteristics and is excessively brittle.

EXAMPLE 13

The procedure of Example 1 is repeated. The formation of the copolymer, however, begins with a monomer mixture having 2-hydroxyethyl methacrylate 10 parts, ethyl acrylate 35 parts, methyl methacrylate 55 parts and the initiator AIBN 3 parts. The resulting copolymer has a glass transition temperature of 38° C.

One hundred parts by weight of the ground copolymer is mixed with the following materials:

| | | |
|---|---|---|
| Dodecyl succinic anhydride | 8 | parts |
| Titanate acetylacetonate | 0.5 | parts |
| Poly(2-ethylhexyl acrylate) | 0.5 | parts |
| Titanium dioxide | 30 | parts |

A powder coating composition is obtained from the mixture by following the process steps of Example 1. The coating composition is applied to a series of test panels as described in Example 1 and baked at 180° C for 20 minutes. The powder obtained shows excessive caking and is difficult to fluidize for the electrostatic spray application.

EXAMPLE 14

The procedure of Example 1 is repeated. The formation of the copolymer, however, begins with a monomer mixture having 2-hydroxyethyl methacrylate 10 parts, 2-ethylhexyl acrylate 10 parts, acrylic acid 2 parts, acrylonitrile 18 parts, cyclohexyl methacrylate 60 parts and the initiator AIBN 4 parts.

One hundred parts by weight of the ground copolymer is mixed with the following materials:

| | | |
|---|---|---|
| 2,3-bicyclooctane dicarboxylic acid | 15 | parts |
| Stannic chloride | 1 | part |
| Poly (2-ethylhexl acrylate)($\overline{M}_n=90,000$) | 1 | part |
| Titanium dioxide | 30 | parts |

A powder coating composition is obtained from the mixture by following the process steps of Example 1. The coating composition is applied to a series of test panels as described in Example 1 and baked at 170° C for 20 minutes. The coatings obtained on the various panels is of good appearance quality and are resistant to the solvents mentioned in Example 1.

EXAMPLE 15

The procedure of Example 1 is repeated. The formation of the copolymer, however, begins with a monomer mixture having hydroxypropyl methacrylate 15 parts, butyl methacrylate 10 parts, isopropyl methacrylate 75 parts and the initiator AIBN 3 parts.

One hundred parts by weight of the ground copolymer is mixed with the following materials:

| | | |
|---|---|---|
| Benzophenone tetracarboxylic anhydride | 10 | parts |
| Stannic chloride | 1 | part |
| Polybutyl acrylate ($\overline{M}_n=2,500$) | 0.5 | parts |
| Titanium dioxide | 30 | parts |

A powder coating composition is obtained from the mixture by following the process steps of Example 1. The coating composition is applied to a series of test panels as described in Example 1 and baked at a temperature of 205° C for 20 minutes. The coatings obtained on the various test panels are of good appearance quality and are resistant to the solvents mentioned in Example 1.

EXAMPLE 16

The procedure of Example 1 is repeated. The formation of the copolymer, however, begins with a monomer mixture having hydroxypropyl acrylate 15 parts, methacrylic acid 2 parts, ethylthioethyl methacrylate 1 part, ethyl methacrylate 72 parts, isobutyl acrylate 10 parts and the initiator AIBN 3 parts.

One hundred parts by weight of the ground copolymer is mixed with the following materials:

| | |
|---|---|
| Methyl succinic anhydride | 8 parts |
| Tetrabutyl titanate | 0.5 parts |
| Polyethylene glycol perfluoro octoate ($\overline{M}_n = 6,000$) | 2 parts |
| Titanium dioxide | 30 parts |

A powder coating composition is obtained from the mixture by following the process steps of Example 1. The coating composition is applied to a series of test panels as described in Example 1 and baked at a temperature of 170° C for 30 minutes. The coatings obtained on the various panels are of good appearance quality and are resistant to the solvents mentioned in Example 1.

Many modifications of this invention will be apparent to those skilled in the art in view of this specification. It is intended that all such modifications which fall within the scope of this invention be included within the appended claims.

We claim:

1. A powder coating composition which, exclusive of pigments and other nonreactive components, comprises a coreactable mixture of: (A) a copolymer of (i) about 5 to about 20 weight percent of a hydroxy functional monoethylenically unsaturated monomer selected from the group consisting of hydroxyl bearing aliphatic alcohol esters of acrylic or methacrylic acid and (ii) a remainder of monofunctional alpha-beta olefinically unsaturated monomers selected from the group consisting essentially of
   (i) acrylates,
   (ii) mixtures of acrylates and monovinyl hydrocarbons, and
   (iii) mixtures of acrylates, monovinyl hydrocarbons, and modifying monomers selected from the group consisting of vinyl chloride, acrylonitrile, methacrylonitrile and vinyl acetate, said monovinyl hydrocarbons, when included in said copolymer, comprising less than 50 weight percent thereof and said modifying monomers, when included in said copolymer, comprising up to about 35 weight percent thereof, said copolymer having a glass transition temperature in the range of about 40° to about 90° C and a molecular weight ($\overline{M}_n$) in the range of 2,000 to 10,000; and (B) a crosslinking agent selected from the group consisting of organic carboxylic acids and organic carboxylic acid anhydrides in the amount of between about 0.8 and about 1.1 crosslinkable functional groups for each hydroxy group in the copolymer.

2. A powder coating composition in accordance with claim 1 wherein said copolymer has a glass transition temperature between about 50° and about 80° C and a molecular weight ($\overline{M}_n$) between about 3,000 and about 6,500.

3. A powder coating composition in accordance with claim 1 wherein said copolymer has a glass transition temperature between about 50° and about 75° C and a molecular weight ($\overline{M}_n$) between about 3,000 and about 4,000.

4. A powder coating composition in accordance with claim 1 wherein said crosslinking agent is an organic carboxylic acid selected from the group consisting of: (1) saturated aliphatic carboxylic acids containing between about 4 and about 20 carbon atoms; (2) unsaturated aliphatic carboxylic acids containing between about 4 and about 20 carbon atoms; (3) aromatic carboxylic acids; (4) saturated alicyclic carboxylic acids; (5) unsaturated alicyclic carboxylic acids; (6) heterocyclic carboxylic acids; (7) polymers of saturated aliphatic carboxylic acids; (8) polymers of unsaturated carboxylic acids; and (9) mixtures thereof.

5. A powder coating composition in accordance with claim 4 wherein said organic carboxylic acid is a dicarboxylic acid.

6. A powder coating composition in accordance with claim 5 wherein said dicarboxylic acid is selected from the group consisting of succinic acid, glutaric acid, adipic acid, pimelic acid, azelaic acid, phthalic acid, isophthalic acid and terephthalic acid.

7. A powder coating composition in accordance with claim 1 wherein said crosslinking agent is an anhydride of an organic carboxylic acid selected from the group consisting of: (1) saturated aliphatic carboxylic acids containing between about 4 and about 20 carbon atoms; (2) unsaturated aliphatic carboxylic acids containing between about 4 and about 20 carbon atoms; (3) aromatic carboxylic acids; (4) saturated alicyclic carboxylic acids; (5) unsaturated alicyclic carboxylic acids: (6) heterocyclic carboxylic acids: (7) polymers of saturated aliphatic carboxylic acids; (8) polymers of unsaturated aliphatic carboxylic acids; and (9) mixtures thereof.

8. A powder coating composition in accordance with claim 7 wherein said carboxylic acid anhydride crosslinking agent is selected from the group consisting of phthalic anhydride, cyclohexane-1,2 dicarboxylic anhydride, 4 methylhexane-1,2 dicarboxylic anhydride, cyclopentane-2,2 dicarboxylic anhydride, succinic anhydride, dodecyl succinic anhydride; maleic anhydride, poly (azelaic anhydride), and methylsuccinic anhydride.

9. A powder coating composition in accordance with claim 1 wherein said acrylates consist essentially of esters of $C_1$-$C_{12}$ monohydric alcohols and acrylic or methacrylic acid.

10. A powder coating composition in accordance with claim 1 wherein said monovinyl hydrocarbons contain 8 to 12 carbon atoms.

* * * * *